Feb. 21, 1956  B. A. GRUBER ET AL  2,735,668
RECOVERY OF SODIUM AND CALCIUM METALS
FROM ELECTROLYTIC SLUDGE
Filed Dec. 1, 1952

United States Patent Office 2,735,668
Patented Feb. 21, 1956

2,735,668

RECOVERY OF SODIUM AND CALCIUM METALS FROM ELECTROLYTIC SLUDGE

Bernard A. Gruber, Lynnfield, Emanuel Gordon, Salem, and Robert A. Jermain, Manchester, Mass., assignors to Metal Hydrides Incorporated, Beverly, Mass., a corporation of Massachusetts Application December 1, 1952, Serial No. 323,412

1 Claim. (Cl. 266—19)

This invention relates to the recovery of metals by distillation and relates especially to the separation and recovery of one or more metals from a material containing the desired metal and other elements, such as another metal or salts or oxides, etc. More specifically, the invention relates to a method and apparatus for separating and recovering calcium and sodium metals from the sludge or filter cake obtained as a by-product in the electrolytic production of sodium metal. Such sludge usually contains about 20 per cent of calcium metal and 70 per cent sodium metal, the balance being 8 to 9 per cent sodium oxide and 1 to 2 per cent chlorides.

The separation and recovery of calcium from electrolytic sludges containing sodium and salts has presented a difficult problem for a long time. So far as we are aware, all manufacturers obtaining such sludges as a by-product have resorted to chemical treatment of the sludge to effect separation and recovery of calcium or sodium. None of these methods are adapted for the recovery of both the calcium and sodium metals. Thus, United States Patent No. 2,527,443 describes treatment of the sludge with an aqueous solution of sodium hydroxide. Patents Nos. 2,543,399 and 2,543,407 involve treating the sludge with a lower aliphatic alcohol under anhydrous conditions and in the presence of water respectively. Patent No. 2,543,406 involves treating the sludge with an organic solvent which reacts preferentially with the sodium and dissolves the reaction product. Patent No. 2,054,316 describes a method for recovering sodium from the sludge by subjecting it to an oxidizing treatment to oxidize the calcium and then separating the sodium metal from the calcium oxide.

The method most commonly employed commercially for producing calcium metal prior to the present invention involved the reduction of calcium oxide with aluminum to form a mixture of aluminum oxide and calcium metal. The calcium metal then was distilled from the mixture and condensed in a detachable condenser in the form of a muff. After cooling, the condenser was removed from the furnace and the muff of solid calcium metal was melted and cast in the form of an ingot. This distillation method is not adaptable for the separation and recovery of both calcium and sodium metals from the previously mentioned sludge. Furthermore, while calcium metal suitable for many industrial uses can be produced by this method, a substantial amount of nitrogen is introduced into the calcium metal during the removal of the condenser from the furnace and the melting of the muff to form an ingot. The presence of nitrogen in the metal renders it undesirable for many industrial uses. This method also has the disadvantage of low volume production since it is a batch method and in practice only about 10 pounds of calcium can be produced from each retort charge and the complete operation requides 8 to 10 hours.

The present invention provides a distillation apparatus which may be employed to effect the separation and recovery of both calcium and sodium metals from the above mentioned sludge. The apparatus is adapted for the practice of a novel method for effecting such separation in a continuous or semi-continuous operation and without subjecting the metal to air until after the metal has been cast into ingots.

The apparatus of the invention is hermetically sealed and comprises a substantially vertical distillation receptacle communicating at its upper portion with one end of a condenser which is arranged to permit the flow of molten metal toward its other end. The latter end of the condenser is provided with a valve-controlled outlet which in turn communicates with a metal molding arrangement. The apparatus also includes means for continuously feeding molten sludge, or other material to be subjected to distillation, into the distillation receptacle while maintaining the apparatus in its normally hermetically sealed condition.

These and other features of the invention will be more clearly understood from the following description in conjunction with the accompanying drawings: in which, Fig. 1 is an elevational view of an apparatus embodying the invention;

Fig. 4 is an enlarged sectional elevational view of another portion of the apparatus shown in Fig. 1.

Fig. 5 is an enlarged sectional elevational view of another portion of the apparatus shown in Fig. 1.

Figure 1:
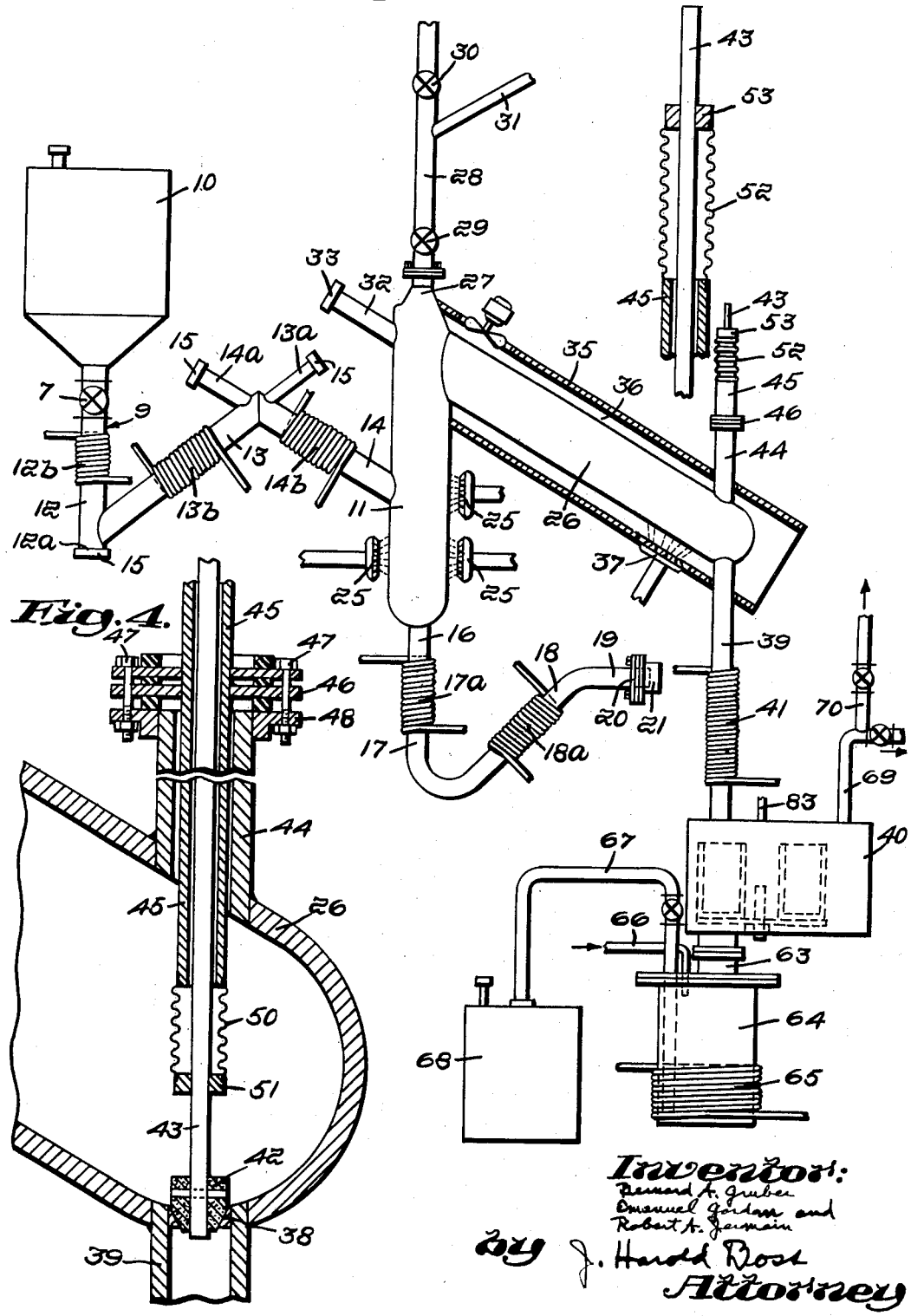

As illustrated in the accompanying drawings, one embodiment of the invention comprises a feed pot 10 (Fig. 1) adapted to receive molten material to be distilled. If desired, the pot 10 may be provided with a heating jacket (not shown) to supply heat to melt therein the material to be distilled. Communication is provided between the interiors of the pot 10 and a vertical distillation receptable 11 by a conduit 9 consisting of the vertical portion 12 having a valve 7, the upwardly inclined portion 13 and the downwardly inclined portion 14. The conduit portions 12, 13 and 14 are provided with outwardly extending clean-out portions 12a, 13a and 14a respectively, the outer open end of each of which normally is closed by a hermetically sealed detachable closure 15. The conduit portions 12 and 13 are provided with means for heating and cooling the same indicated at 12b and 13b respectively while the conduit portion 14 is provided with heating means 14b.

The bottom of the distillation receptacle 11 communicates with a waste residue outlet conduit 16 having a vertical portion 17, the lower end of which communicates with an upwardly inclined portion 18 which communicates with a horizontal portion 19. The portion 19 is provided with an annular flange 20 extending therefrom in a plane spaced back of its open end. A cup shaped closure 21 is detachably secured to the flange 20 with a gasket interposed therebetween to provide a hermetically sealed closure. The vertical portion 17 and the portion 18 of the waste outlet 16 are provided with means 17a and 18a respectively for heating or cooling the same. It will be understood that when the pot 10 and outlet 16 contain molten material, the latter prevents the admission of air through these parts into the receptacle 11.

Suitable means, such as heaters 25 are provided for heating the distillation receptacle 11 and its contents to a suitable distillation temperature. The upper portion of the receptacle 11 communicates with one end of a condenser 26 which inclines downwardly therefrom. A vertical conduit 27 of truncated conical shape communicates with the upper portion of the receptacle 11. A tubular conduit 28 is detachably secured to the outer end of conduit 27 and is provided with spaced valves 29 and 30. Conduit 28 also communicates with a branch conduit 31 which may be connected to a source of an inert gas or to a vacuum pump. If desired, a cleanout conduit 32 may extend outwardly from the upper portion of receptacle 11 in alignment with condenser 26. The outer end of conduit 32 normally is hermetically closed by a detachable closure 33.

The condenser 26 is surrounded by a concentric shell 35 to provide a passage 36 therebetween. Heaters 37 are positioned at the lower portion of the passage 36. Suitable conventional means (not shown) may be provided at the upper end of shell 35 for drawing air into the lower end of the passage 36 and through the same and thereby heat the condenser when the heaters 37 are operating or cool the condenser when the heaters 37 are not operating.

The lower end of condenser 26 is provided with an outlet passage 38 (Fig. 4) communicating with one end of a vertical discharge conduit 39, the other end of which communicates with a casting chamber 40 in which molten metal may be cast. The conduit 39 may be provided with means 41 for heating the same. The outlet passage 38 may be closed by a valve 42, such as a graphite plug. The valve 42 is secured to one end of a rod 43. A vertical tube 44 is secured in the wall of the condenser 26 in alignment with the outlet passage 38 and discharge conduit 39 and communicates with the interior of the condenser 26. A tube 45 extends through the tube 44 and is provided with an annular flange 46 which is secured, as by bolts 47, to a flange 48 extending outwardly from the upper end of the tube 44, a gasket being interposed between the flanges 46 and 48 to assure a gas tight connection. One end of a bellows 50 is hermetically secured to the lower end of the tube 45 and its other end is hermetically secured to a collar 51 which is secured to the rod 43. One end of a bellows 52 is hermetically secured to the tube 45 near its upper end. The other end of the bellows 52 is hermetically secured to a collar 53 which is secured to the rod 43.

Figure 2:
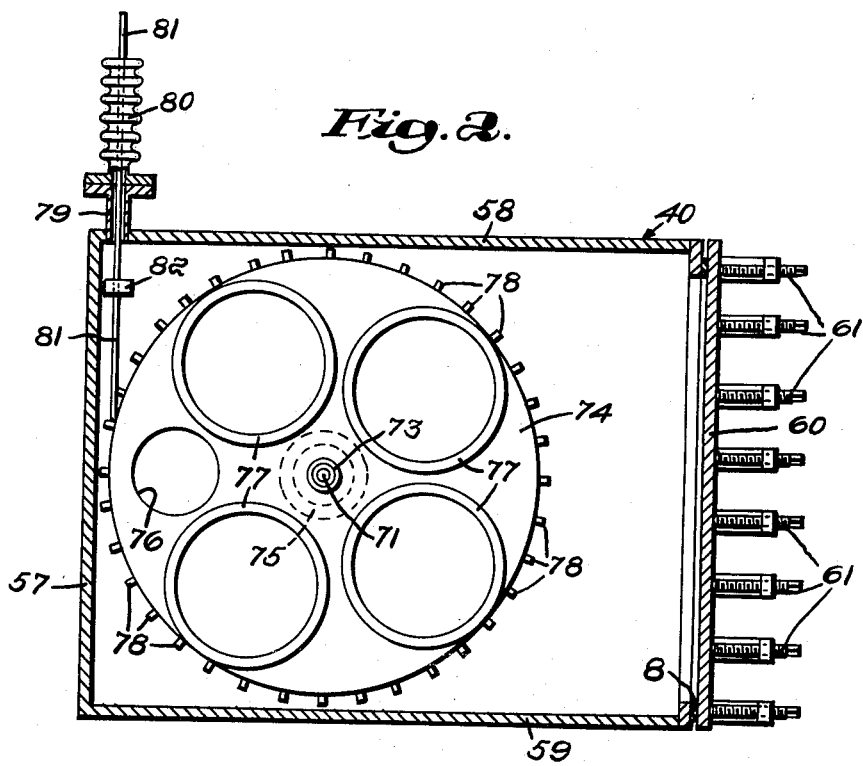
Fig. 2 is a sectional view taken on the line 2—2 of Fig. 3.
Figure 3:
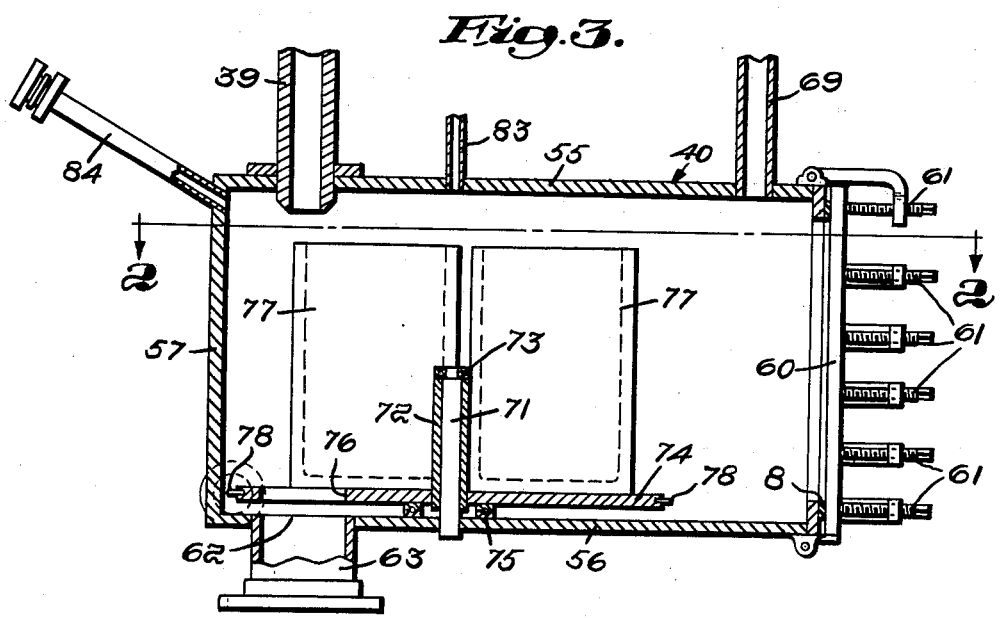
Fig. 3 is an enlarged sectional elevational view of a portion of the apparatus shown in Fig. 1.

The casting chamber 40 comprises stationary top and bottom walls 55 and 56 respectively, a stationary end wall 57 and stationary side walls 58 and 59 (Figs. 2 and 3). End wall 60 is hinged to the bottom wall 56 and is held in its closed position by a plurality of releasable clamps 61. End wall 60 normally is hermetically sealed by a gasket 8. The bottom wall 56 is provided with a discharge outlet 62 in vertical alignment with the conduit 39 which enters the chamber 40 through its top wall 55. One end of conduit 63 is fitted in the outlet 62 and is secured to bottom wall 56. The other end of conduit 63 is secured to and communicates with the interior of a tank 64 (Fig. 1) which is provided with suitable heating means 65. A pipe 66 is mounted in the top of the tank 64 and terminates just inside thereof. The other end of the pipe 66 is connected to a source (not shown) of an inert gas, such as argon. A pipe 67 also passes through the top of the tank 64 and extends to near the bottom of the tank. The other end of the pipe 67 communicates with a tank 68.

A valve controlled conduit 69 (Fig. 1) is arranged to communicate at one end with the interior of the chamber 40 and is adapted to be connected to a vacuum pump (not shown). The conduit 69 communicates with a valve controlled branch conduit 70 adapted to be connected to a source of an inert gas, such as argon. A shaft 71 (Fig. 3) extends vertically within the chamber 40 from its bottom wall 56 (Fig. 3). A sleeve 72 surrounds the shaft 71 and is rotatably mounted thereon through roller bearings 73. A circular platform 74 is secured to the sleeve 72 in spaced relation to the bottom wall 56 and is rotatably supported by roller bearings 75 interposed therebetween. The platform 74 is provided with an opening 76 (Fig. 2) adapted to be brought in alignment with the conduit 39 and discharge outlet 62. The platform also is adapted to receive a plurality of molds 77 which, by rotation of the platform 74, may be brought successively beneath the conduit 39 to receive molten metal for casting.

The edge of the platform 74 is provided with a plurality of radially projecting studs 78 (Fig. 3). A tube 79 (Fig. 2) is mounted in side wall 58 to provide a passage therethrough. A hermetically sealed connection is provided between the outer end of the tube 79 and one end of a bellows 80. The other end of the bellows 80 is secured by a hermetically sealed connection to an intermediate portion of a rod 81 which extends through the bellows 80 and tube 79 into the chamber 40 and between spaced guides 82. The rod 81 is positioned in the plane of rotative movement of the studs 78 so the inner end of the rod may be brought in engagement successively with adjacent studs 78 to cause rotative movement of the platform 74 and thereby bring the passage 76 and the molds 77 successively beneath the conduit 39.

In order to observe the interior of the chamber 40 from without a tube 83 containing a source of light is mounted in the top wall 55 and a sight tube 84 is mounted in end wall 57.

The apparatus of the invention is especially adapted for the recovery of sodium and calcium metals from electrolytic sludges of the type previously referred to. When used for this purpose, the rod 81 is moved axially to engage successively adjacent studs 78 on the platform 74 to rotate the latter to bring the passage 76 therein in alignment with the conduit 39 and discharge outlet 62. The valves in the conduits 9 and 70 are closed and the valve 42 and the valve in the conduit 69 are opened to subject the intercommunicating portions of the apparatus to vacuum to remove air and moisture. The valve in the conduit 69 then is closed and the valve in conduit 70 is opened to fill the apparatus with argon at about atmospheric pressure. Sludge then is introduced into the pot 10 and melted at a temperature of about 120° C. The valve 7 then is opened to permit the molten sludge to flow through conduit 9 into receptacle 11 and conduit 16. The sludge in conduit 16 may be frozen therein if desired by a cooling medium supplied by means 17a and 18a to assure an effective seal.

Feeding of sludge into the pot 10 is continued and the molten sludge is permitted to flow into the distillation receptacle 11 while the latter is heated continuously to a temperature between 900° C. and 1,000° C. The sodium metal distills from the receptacle 11 and the sodium vapors pass into the condenser 26 where they are condensed to liquid form. In order to condense the sodium metal to liquid while preventing its condensation to the solid phase in the condenser, the heaters 37 are operated to supply heat to the passage 36 while air is drawn through the passage to heat the condenser wall to a temperature above the melting temperature of sodium but below its boiling temperature, such for example as 400° C. The molten sodium flows through the condenser 26 and its outlet passage 38 into conduit 39 from which it is discharged and passes by gravity through the opening 76 in platform 74 and through discharge outlet 62 into conduit 63 and thence into the tank 64.

Feeding of molten sludge from pot 10 into receptacle 11 and distillation of sodium metal and its condensation and collection in tank 64 is continued until a predetermined liquid level of molten calcium-rich material is obtained in receptacle 11. Feeding of molten sludge into the receptacle 11 then is stopped and, if desired, sludge in the conduit 9 may be frozen therein by a cooling medium supplied by the means 12b and 13b to assure an effective seal preventing the entrance of air through this portion of the apparatus. The valve in conduit 70 then is closed and the valve in conduit 69 is opened to subject the intercommunicating portions of the apparatus to vacuum and establish a pressure therein of about 20 microns.

Under this pressure and with the temperature of the receptacle 11 maintained at a temperature between 900° C. and 1,000° C., calcium metal is distilled from the calcium-rich mixture in the receptacle 11 and the calcium vapors pass into the condenser 26 where they are condensed. By very accurate control of the pressure and temperature within the condenser, the calcium vapors can be condensed as a liquid. We presently prefer, however, to control the heaters 37 and the air flow through the passage 36 to maintain the condenser at a temperature, such as about 600° C., to cause the calcium vapors to condense therein as a solid muff. When the liquid level of the molten calcium-rich mixture in receptacle 11 has reached a predetermined minimum liquid level, as determined by any suitable conventional liquid level measuring device, distillation of calcium is stopped by closing the valve in conduit 69 and opening the valve in conduit 70 thereby introducing argon and establishing a pressure of about atmospheric pressure within the intercommunicating portions of the apparatus. The platform 74 then is rotated by movement of the rod 81 axially to engage successively adjacent studs 78 until one of the molds 77 is directly beneath the conduit 39.

The rod 43 then is moved downward to move the valve 42 into position to close the condenser discharge outlet 38. The temperature of the condenser then is increased by suitable control of the heaters 37 and the flow of air through the passage 36 to melt the solid muff of calcium metal and collect it in a liquid pool in the lower end of the condenser. The rod 43 then is moved upward to raise the valve 42 and open the condenser outlet 38 to permit the molten calcium to flow down through conduit 39 and into the mold 77 to form a casting. If the volume of molten metal in the pool is greater than the capacity of one mold 77, the valve 42 can be closed when the mold is full to shut off the flow of metal from the molten pool in the condenser. The platform 74 then may be rotated as previously described to bring a second mold 77 beneath the conduit 39. The valve 42 then is again opened to permit molten calcium to flow into the second mold. These operations are repeated until all the molten calcium has been discharged from the condenser into molds in the chamber 40. During these operations heat may be supplied to the conduit 39 by the heating means 41 to prevent undue cooling or solidification of the molten metal therein.

The above described cycle of operations is repeated. Thus, the platform 74 is rotated as previously described to bring the opening 76 therein in alignment with the conduit 39 and discharge outlet 62. The valve 42 is open and the intercommunicating portions of the apparatus are filled with argon under about atmospheric pressure. If the sludge in conduit 9 has been frozen, it now is melted by heat supplied by the means 12b and 13b. Additional sludge now is again melted continuously in the pot 10 and flowed into receptacle 11. The sodium metal is distilled therefrom and condensed in the condenser 26 as a liquid and is collected in the tank 64 as previously described.

Feeding of sludge into the receptacle 11 and distillation of sodium and its collection in tank 64 is continued as previously described until a predetermined liquid level of molten calcium-rich material is again obtained in receptacle 11. The intercommunicating portions of the apparatus are again subjected to a reduced pressure while maintaining the receptacle at a temperature of 900° C. to 1,000° C. to cause calcium metal to be distilled from the receptacle 11 and condensed as a solid muff in the condenser as previously described. When the liquid level in receptacle 11 has been reduced to a predetermined minimum, the vacuum within the receptacle 11 and condenser 26 is broken and argon is admitted to establish therein a pressure of about atmospheric pressure as previously described. The solid muff of calcium then is melted and cast in the molds 77 as previously described.

It will be understood that the above described cycles of operation may be continued as long as desired thus making possible the recovery of calcium and sodium metals from sludge or other equivalent material as a substantially continuous operation. During the step of distilling calcium and collecting it as a solid muff, the valve 42 may be closed to seal the distillation and condensation portions of the apparatus from the casting portions. The hinged end wall 60 of the chamber 40 then may be opened to replace the molds 77 containing cast calcium metal by empty molds without interrupting the cycles of operation. This portion of the apparatus then may be again hermetically sealed and subjected to vacuum or an atmosphere of an inert gas. As an alternative procedure, the molds 77 may be replaced, between cycles of operation, that is, after casting of calcium and before again starting distillation of sodium from more sludge.

When the tank 64 becomes filled with sodium metal, heat is supplied thereto by the heating means 65 to assure its molten condition. An inert gas, such as argon, under pressure then is introduced through the conduit 66 into the tank 64 above the molden sodium. The valve in conduit 67 then is opened to permit the pressure of the inert gas above the molten sodium to force the latter through the conduit 67 into the tank 68.

When the apparatus is used for the recovery of sodium and calcium metals from the above described sludge, the oxides and salts present in the sludge accumulate in the bottom of the receptacle 11. When this accumulation of impurities becomes excessive, it is desirable to remove them from the receptacle. This may be accomplished in the following manner. Heating of the receptacle 11 is continued as previously described. The valve 30 in conduit 28 is opened and calcium chloride is introduced into the conduit. The valve 30 then is closed and the conduit evacuated by a vacuum pump connected to conduit 31. The valve 29 in conduit 28 then is opened to permit the calcium chloride to fall into the receptacle 11 upon the residue of impurities accumulated therein. A suitable weight of calcium chloride is about twice that of such impurities. The calcium chloride rapidly wets and dissolves the mass of impurities to form a molten solution. The solid material in the conduit 16 is melted by heat supplied by the means 17a and 18a and the closure 21 is removed from end of the conduit portion 18. The molten material in the conduit 16 together with the solution of calcium chloride and impurities flows out through the open end of the conduit 16 into a waste receptacle (not shown). When flow stops, the closure 21 is replaced. Due to the shape of the conduit 16, some of the molten solution remains therein and may be frozen by a cooling medium supplied by the means 17a and 18a. The apparatus then is ready for continuation of the cycles of operation previously described.

The sodium metal recovered as above described may be reacted with calcium chloride to produce calcium metal in accordance with the reaction described in United States patent to Harvey N. Gilbert No. 2,029,998. Thus, when a mixture of sodium metal and calcium chloride is melted at a temperature of between 700° C. and 800° C. to form a molten bath, a reaction takes place which may be represented as follows:

$$2Na + CaCl_2 \rightarrow Ca + 2NaCl$$

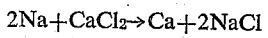

In order to prevent a reversal of the above reaction, the calcium chloride content of the bath is maintained at a high value, e. g. more than 70 per cent by weight. The calcium-rich alloy thus formed segregrates in the bath and may be easily separated.

The calcium may be recovered from this calcium-rich alloy by distillation in substantially the same manner as from the electrolytic sludges. However, since this calcium-rich alloy has a melting temperature considerably greater than that of the sludge, it is preferred to introduce the calcium-rich alloy into the distillation receptacle 11 in the same manner as the calcium chloride was introduced as previously described for dissolving the accumulation of impurities therein.

We claim:

A normally hermetically sealed apparatus for separately recovering sodium and calcium metals by distillation from electrolytic sludge containing said metals which comprises a substantially vertical distillation receptacle, a condenser communicating with the upper portion of said receptacle and arranged to permit molten metal to flow therein toward its other end by gravity, said other end of the condenser having a discharge outlet, a valve for opening and closing said outlet, means for opening and closing said valve while maintaining the apparatus hermetically sealed, means adapted for communication with said outlet for separately casting said metals while maintaining the apparatus hermetically sealed, means for feeding molten sludge into the distillation receptacle while maintaining it hermetically sealed, means for introducing an inert gas at atmospheric pressure into the intercommunicable portions of the apparatus, means for subjecting said intercommunicable portions to reduced pressure, means for controlling the temperature of said condenser, and means for heating the sludge in said receptacle to a temperature above the boiling temperature of sodium metal but below the boiling temperature of calcium metal at atmospheric pressure whereby sodium metal may be distilled and recovered from the sludge in said receptacle when said inert gas is in said intercommunicable portions and said calcium metal may be distilled at said temperature and recovered from said sludge when said intercommunicable portions are subjected to reduced pressure.

References Cited in the file of this patent

UNITED STATES PATENTS

| | | |
|---|---|---|
| 204,307 | Duff | May 28, 1878 |
| 211,953 | Barnum | Feb. 4, 1879 |
| 460,985 | Netto | Oct. 13, 1891 |
| 2,054,316 | Gilbert | Sept. 15, 1936 |
| 2,255,549 | Kruh | Sept. 9, 1941 |
| 2,556,763 | Maddex | June 12, 1951 |
| 2,689,791 | Boag | Sept. 21, 1954 |